United States Patent [19]

Parker et al.

[11] Patent Number: 5,454,641
[45] Date of Patent: Oct. 3, 1995

[54] TEMPERATURE TRANSDUCER ASSEMBLY

[75] Inventors: Thomas W. Parker, Columbus; Charles D. Grant, Powell, both of Ohio

[73] Assignee: Ranco Incorporated of Delaware, Wilmington, Del.

[21] Appl. No.: 180,671

[22] Filed: Jan. 13, 1994

[51] Int. Cl.$^6$ .............................. G01K 1/14; G01K 1/16; G01K 13/00
[52] U.S. Cl. ........................ 374/120; 374/147; 374/208; 236/DIG. 6
[58] Field of Search ................................. 374/120, 147, 374/208; 165/11.1; 236/DIG. 6

[56] References Cited

U.S. PATENT DOCUMENTS

| | | |
|---|---|---|
| 2,484,585 | 10/1949 | Quinn . |
| 2,979,586 | 4/1961 | Siri .................................. 236/DIG. 6 |
| 3,123,790 | 3/1964 | Tyler . |
| 3,357,249 | 12/1967 | Bernous et al. . |
| 3,511,091 | 5/1970 | Thome ................................. 374/147 |
| 3,789,340 | 1/1974 | Adams . |
| 3,981,266 | 9/1976 | Persson ................................ 374/147 |
| 4,303,827 | 12/1981 | Kyles ............................... 236/DIG. 6 |
| 4,527,908 | 7/1985 | Arisi ..................................... 374/147 |
| 4,575,258 | 3/1986 | Wall ..................................... 374/147 |
| 4,881,057 | 11/1989 | Garcia et al. . |
| 4,882,908 | 11/1989 | White . |
| 5,172,979 | 12/1992 | Barkley et al. ......................... 374/147 |
| 5,281,793 | 1/1994 | Gavin et al. .......................... 374/208 |
| 5,382,093 | 1/1995 | Dutcher ................................. 374/147 |

FOREIGN PATENT DOCUMENTS

| | | | |
|---|---|---|---|
| 0032781 | 3/1978 | Japan ..................................... 374/208 |
| 0219841 | 9/1986 | Japan ..................................... 374/208 |

*Primary Examiner*—Diego F. F. Gutierrez
*Attorney, Agent, or Firm*—Watts, Hoffmann, Fisher & Heinke

[57] ABSTRACT

A temperature sensing assembly for a heat exchanger flow tube comprises a housing having a thin heat transmitting wall section in heat conducting engagement with a flow tube, and a relatively thick, heat insulating structural support wall section; a thermally responsive signal producing assembly comprising an electrical signal producing element in heat transfer relationship with the heat transmitting wall section; an anchoring arrangement for positioning the signal producing element in heat exchange relationship with the heat transmitting wall section; a heat transfer element between the housing and heat exchanger flow tube tending to maintain the flow tube and heat insulating wall section temperatures the same; and an insulating jacket surrounding part of the heat transfer element.

6 Claims, 3 Drawing Sheets

TEMPERATURE TRANSDUCER ASSEMBLY

FIELD OF THE INVENTION

The present invention relates to a temperature sensing assembly and more particularly to a temperature sensing assembly for monitoring the temperature of an object in an ambient fluid having a temperature which is different from that of the object.

Temperature sensing assemblies for monitoring the temperature of an object in an ambient fluid having a different temperature are used in many different applications. An example is a "heat pump" refrigeration system used for heating and cooling buildings. During cold weather when a heat pump is used to heat a building, refrigerant is passed through an outdoor heat exchanger where it is evaporated and gathers heat from outdoor air. The refrigerant is then compressed and passed through an indoor heat exchanger where the heat is transferred from the refrigerant to indoor air for heating the building.

The outdoor heat exchanger typically includes a highly conductive metal flow tube through which the refrigerant flows for efficient heat exchange between the tube and its environment (usually atmospheric air). Atmospheric air is blown across the heat exchanger to maximize convective heat transfer between the flow tube and the air. When the outdoor air is moist or cold, frost or ice may form on the outdoor heat exchanger flow tubes. The ice or frost insulates the tubes. Thus heat flow into refrigerant in the flow tube from the flowing air is impeded. The impeded heat transfer reduces the heat pump efficient and requires periodically clearing frost or ice from the outdoor heat exchanger flow tubes.

BACKGROUND ART

In so called "demand defrost" heat pump systems an attempt is made to defrost the outdoor heat exchanger flow tubes only when ice or frost has actually formed. Numerous different approaches to sensing frost or ice accumulations have been proposed. One general approach is to sense the temperature difference between the atmospheric air and the outdoor flow tubes when the atmospheric air temperature approaches freezing. The insulating effect of frost on the flow tube reduces heat flow to the refrigerant from the ambient air. Consequently when ice or frost forms the outdoor heat exchanger flow tube surface temperature drops relative to the ambient air temperature. The existence of a predetermined temperature differential between the flow tube surface and ambient air (at a given temperature) signifies that frost or ice is present and the tube should be defrosted.

As the atmospheric air becomes increasingly colder, the temperature differential indicative of ice or frost on the flow tube becomes progressively smaller. Thus, sensing the tube surface temperature with a high degree of accuracy is essential to effectively operating demand defrost heat pump systems at low outdoor temperatures. Achieving such accuracy is difficult because devices used to sense tube surface temperatures are typically exposed to the ambient air, often with the air flowing over the sensor at considerable velocity. The ambient air transfers heat to the sensor device. This heats the sensor and reduces its ability to accurately signal the flow tube temperature. Defrost cycles are thus forestalled when ice or frost has accumulated and is adversely effecting the system.

Temperature sensor devices have been attached to the outdoor tubes in different ways. One technique was to clamp an electrically insulated temperature sensor device directly onto the tube using a hose clamp or spring clip. This assured good thermal contact between the heat exchanger flow tube and the temperature sensor, but placed the sensor in convective heat transfer relationship with the atmospheric air. Inaccurate flow tube temperature readings resulted. To minimize heat gains from the air, heavy insulating tape was sometimes wrapped around the sensor and flow tube. The tape tended to assume the ambient air temperature and adversely influence the sensor output signal.

In other installations the sensors were encapsulated in molded rubber-like plastic bodies. In still other installations sensors were placed in metal housings clamped to the flow tubes. The housing materials were efficient heat conductors and the sensors were stationed in the housings in a body of plastic material. These devices did not produce acceptably accurate flow tube temperature readings.

Temperature sensors and techniques for mounting them in thermal contact with an object are documented in a number of prior art patents. U.S. Pat. Nos. 2,484,585 to Quinn, 3,123,790 to Tyler and 3,357,249 to Bernous, et al. disclose temperature sensors and mounting techniques for the disclosed temperature sensors.

In order to function as required for a demand defrost application the sensors had to be constructed so that they quickly and accurately monitored the flow tube temperature. This required great thermal conductivity. At the same time the sensors had to be unresponsive to ambient air temperature, an attribute of a good insulator. These conflicting requirements were not satisfied in prior art sensor constructions.

The present invention provides a new and improved temperature sensing assembly for sensing the temperature of a refrigerant flow tube in a heat exchanger and which is so constructed and arranged that the temperature measurements are substantially unaffected by ambient air temperatures and flows.

DISCLOSURE OF THE INVENTION

A temperature sensing assembly for a heat exchanger flow tube, or the like, constructed according to one preferred embodiment of the invention comprises a housing having a thin heat transmitting wall section in heat conducting engagement with a flow tube, and a relatively thick, heat insulating structural support wall section; a thermally responsive signal producing assembly comprising an electrical signal producing element in heat transfer relationship with the heat transmitting wall section; and an anchoring arrangement for positioning the signal producing element in heat exchange relationship with the heat transmitting wall section.

A preferred embodiment employs an anchoring arrangement wherein a positioner latches into engagement with the signal assembly to maintain the signal producing element in heat transfer relationship with the heat transmitting wall.

The preferred heat transmitting wall section is a film which engages a heat exchanger refrigerant flow tube. A heat sink member, in heat transfer relationship with the heat insulating wall section and the heat exchanger flow tube, maintains the heat insulating wall section temperature substantially the same as the flow tube temperature.

Further features and advantages of the invention will become apparent from the following detailed description of a preferred embodiment made with reference to the accompanying drawings which form part of the specification.

BEST MODE FOR PRACTICING THE INVENTION

Figure 1:
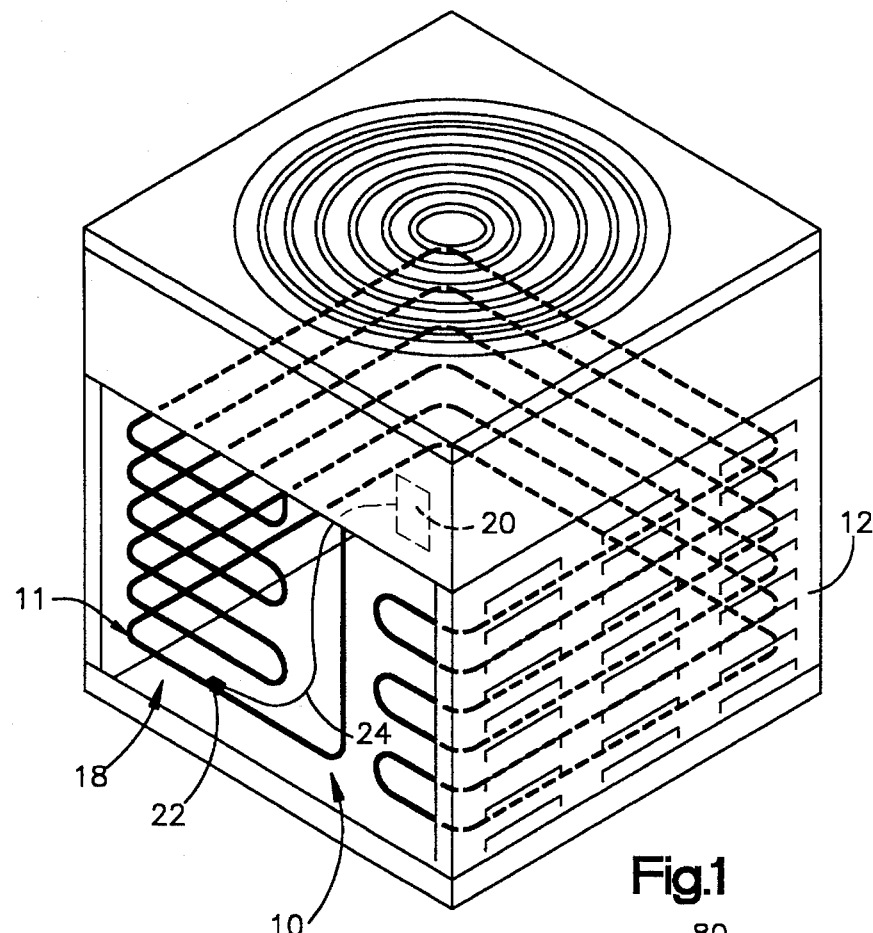
FIG. 1 schematically illustrates an outdoor heat exchanger of a heat pump system used to heat and cool the interior of a building with a refrigerant flow tube temperature sensing assembly and control module attached.
Figure 2:
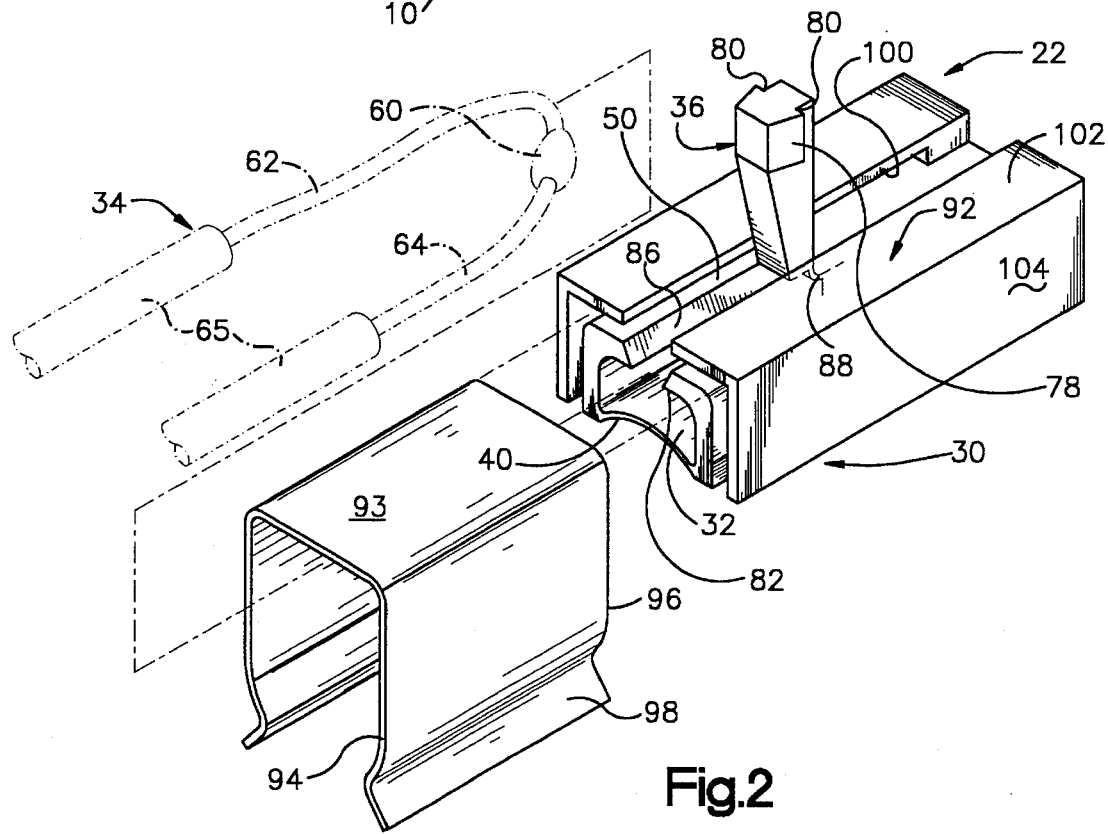
FIG. 2 is a perspective exploded view of a temperature sensing assembly constructed according to the invention with certain parts illustrated in broken lines.
Figure 3:
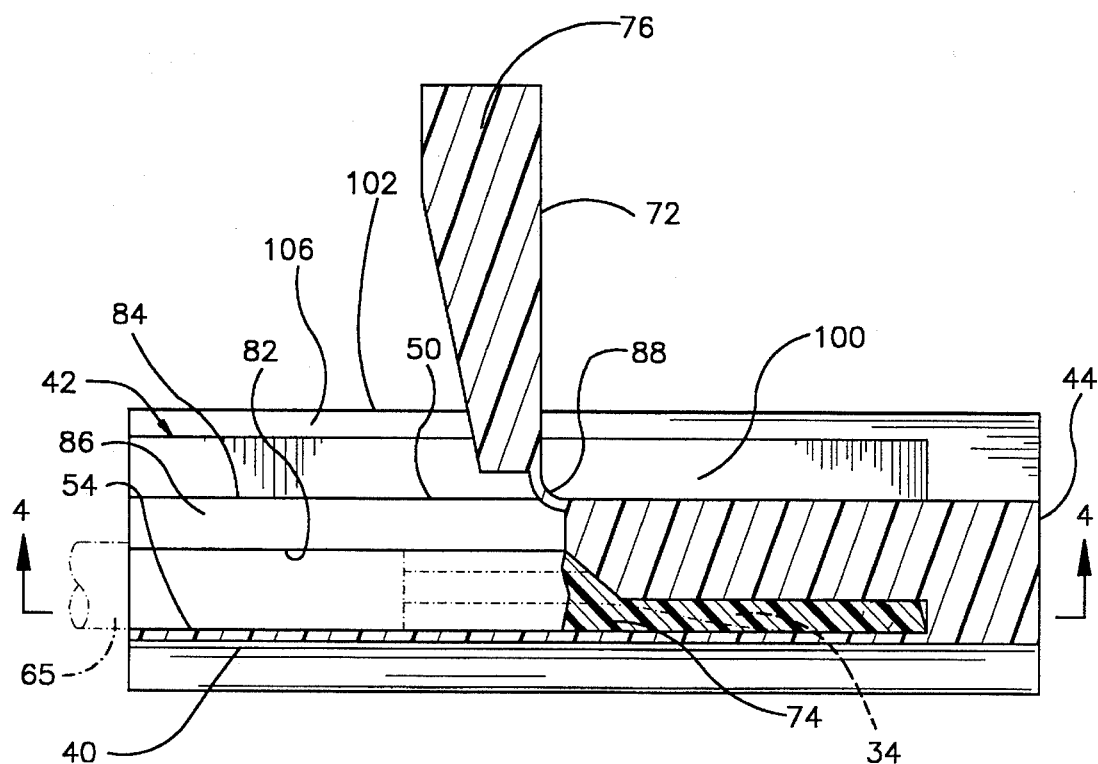
FIG. 3 is a cross sectional view seen approximately from the plane indicated by the line 3—3 of FIG. 5.
Figure 4:
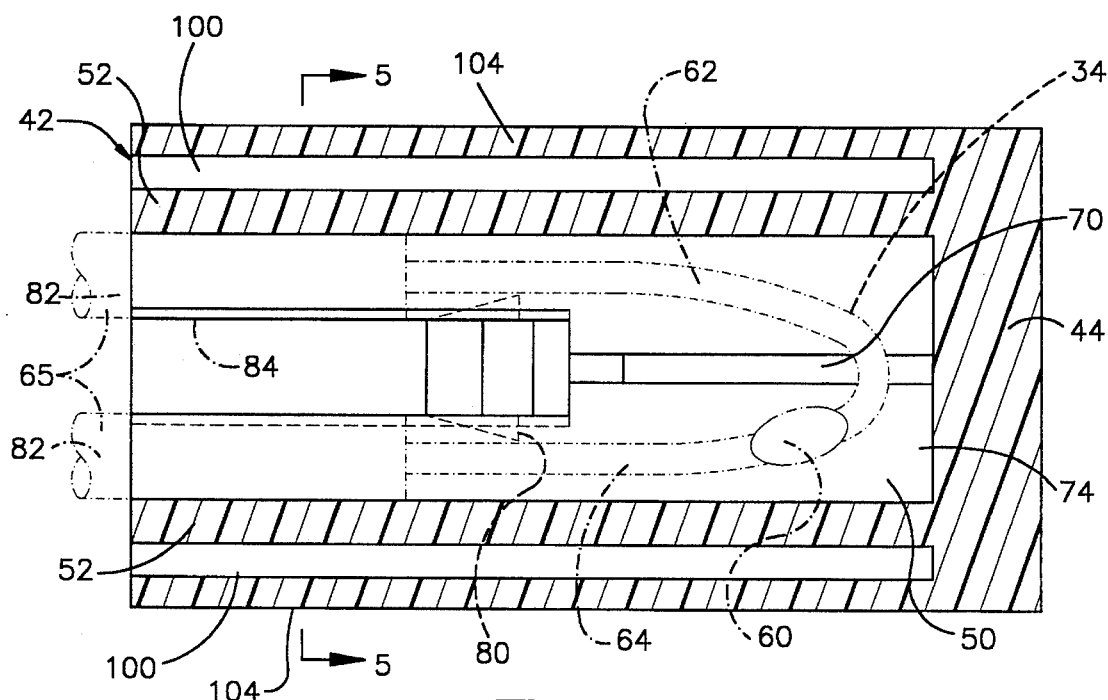
FIG. 4 is a cross sectional view seen approximately from the plane indicated by the line 4—4 of FIG. 3.
Figure 5:
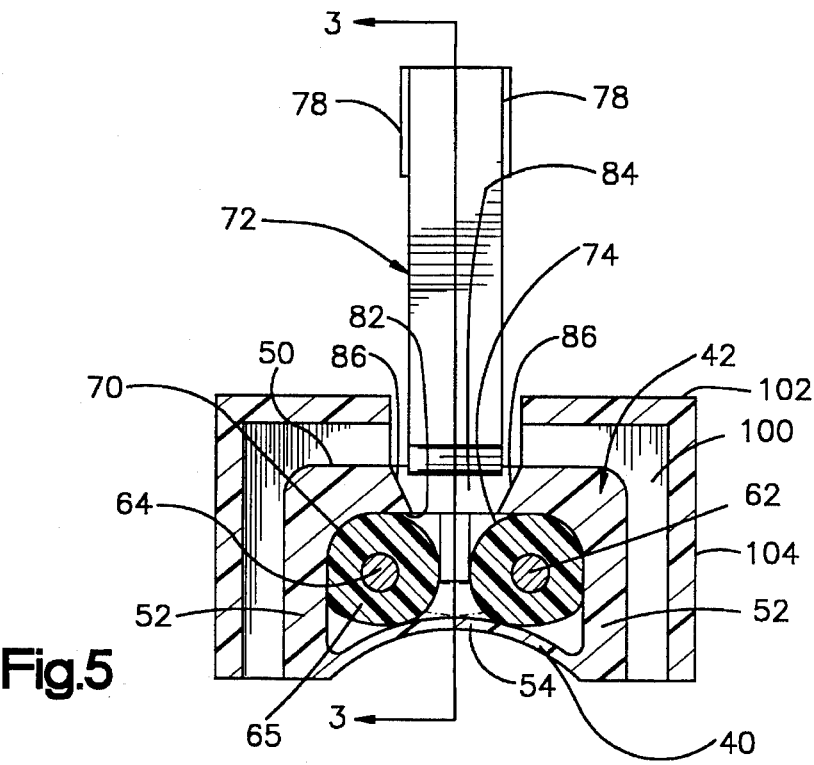
FIG. 5 is a cross sectional view seen approximately from the plane indicated by the line 5—5 of FIG. 4.

FIG. 1 schematically depicts an outdoor heat exchanger installation 10 forming part of a heat pump system for heating and cooling a building. When the building is being heated the heat exchanger installation 10 absorbs heat from atmospheric air and delivers the heat to the building interior. When the building is being cooled, the installation delivers heat from inside the building to the atmospheric air. The installation 10 comprises a heat exchanger 11, a housing, or enclosure, 12 surrounding and supporting the heat exchanger 11, and a blower (not illustrated) supported by the housing for forcing atmospheric air flows across the heat exchanger.

The heat exchanger 11 comprises a long refrigerant flow tube 18 which is wound back and forth within the housing. Closely spaced, thermally conductive metal fins (not illustrated) are assembled to the tube to increase the effectiveness of the convective heat transfer between the tube and the atmospheric air. The blower is located in the top center of the housing and forces atmospheric air through the fins and across the flow tube 18 via appropriate vent openings in the housing walls. The heat exchanger, blower and housing may be of any conventional or suitable construction and therefore are not described in detail.

During cold weather the heat pump system operates to heat the building. The installation 10 absorbs heat from the atmospheric air and delivers the heat to the building interior. When the atmospheric air is well below zero degrees C., the temperature differential between the flow tube 18 and the air may be relatively small. In such conditions ice or frost readily forms on the heat exchanger surfaces. This materially reduces the efficiency of the heat exchanger and requires prompt defrosting.

The presence of ice or frost is reliably signalled when the temperature differential between the air and the flow tube surface exceeds a predetermined value for a given outdoor air temperature. As atmospheric air temperature becomes lower and lower the frost or ice indicating temperature differential steadily decreases to just a few degrees. Flow tube temperature sensing must therefore be extremely accurate for optimum heat pump performance during cold weather.

Defrosting the heat exchanger 11 is preferably controlled in the manner disclosed by U.S. Pat. No. 4,882,908 to White entitled "Demand Defrost Control Method and Apparatus" (the '908 patent), the disclosure of which is hereby incorporated herein in its entirety by this reference. A control module 20, supported by the housing 12, governs the defrosting operation. The control module 20 is associated with a temperature sensing assembly 22 mounted on the flow tube 18 for signalling the flow tube temperature via a signal cable 24, and an atmospheric air temperature sensor, not illustrated, so the differential between the flow tube temperature and the atmospheric air temperature is monitored.

As shown in FIGS. 2–6, the temperature sensing assembly 22 comprises a housing 30 defining a chamber 32 opening at one end of the housing, a thermally responsive signal producing assembly 34 extending into the chamber, anchoring structure 36 for positioning the signal producing assembly in the housing, and mounting structure 38 for connecting the assembly 22 to the flow tube 18. The temperature sensing assembly 22 is mounted at a flow tube location which is best determined according to the geometry of the heat exchanger and enclosure as well as the operating characteristics of the blower.

The housing 30 is formed from a material which is a poor thermal conductor and comprises a thin walled heat transmitting wall section 40 extending substantially the entire length of the housing, a relatively thick, heat insulating structural support wall section 42 coextending with the wall section 40 and a relatively thick, heat insulating end wall 44. The illustrated housing wall sections 40, 42, and 44 define the walls of the chamber 32 and are formed by a single continuous body of molded polycarbonate thermoplastic material such as G. E. Lexan 500r-7344@ or another suitable alternative.

The wall section 40 defines a film (preferably 0.01 in. thick) extending continuously throughout the length of the chamber and shaped to conform to the peripheral flow tube surface. The illustrated film wall is thus concave and cylindrically curved to conform to the circular flow tube cross sectional shape. Even though the thermal conductivity of the film wall material is quite low, the large contact area between the flow tube surface and the wall section 40 together with the short conductive path through the wall, enables the wall section 40 to function as an efficient heat conductor.

The housing wall section 42 comprises a base wall portion 50 and laterally spaced side wall portions 52 extending between the base wall portion edges and the film wall section edges. The housing wall section 42 is "U" shaped in cross section. The concavely curved film wall section medial portion 54 projects toward the base wall portion 50 between the side wall portions.

The housing end wall section 44 is preferably thick and imperforate and closes the chamber end opposite to the open housing end.

The signal producing assembly 34 comprises an electrical signal producing element 60 disposed in the chamber 32 in heat transfer relationship with the heat transmitting wall section 40 and first and second conductors 62, 64 extending into the chamber for completing an electric circuit through the element 60. The conductors 62, 64 form part of the signal cable 24 and are uninsulated in the vicinity of the element 60. Each conductor extends to the control module and is shrouded by a resilient plastic insulator 65. The insulators 65 extend slightly into the chamber 32. The preferred signal producing element is a generally cylindrical thermistor having a larger diameter than the conductors, but any suitable sensing device may be employed.

An anchoring arrangement locates and fixes the signal producing assembly in place in the chamber. The preferred anchoring arrangement comprises a septal rib 70 in the chamber 32 for locating the element 60 near the wall section 40 with the conductors 62, 64 separated, a positioner unit 72 securing the assembly in place in the housing 30, and a body 74 encapsulating the assembly 34 when it has been positioned in the chamber.

The septal rib 70 engages and guides the signal producing assembly as it is inserted into the chamber so that the assembly assumes a desired position in the housing. The rib 70 extends longitudinally along the chamber base wall portion 50 and projects toward the wall section medial portion 54 for engagement with the signal producing assembly. The rib projects sufficiently far into the housing so the element 60 is maintained in position along one side wall portion 52 and the conductors are effectively spaced from each other in the chamber. One of the conductors forms a loop-like projecting end of the signal producing assembly 34 and is guided into close proximity with the wall section 40 by the rib. This interaction assures that the element 60 is likewise positioned close to the wall section 70.

The positioner unit 72 secures the signal producing assembly in place in the housing so that tensile forces tending to pull the housing 30 from the cable 24 are not exerted on the signal producing assembly. The unit 72 comprises a positioner member 76 for engaging and positioning the signal producing assembly and a latching mechanism for securing the positioner member in place.

The preferred positioner member 76 has a shaped end projecting into the chamber between the conductors 62, 64 adjacent the open chamber end. The positioner member end comprises outwardly diverging wedging faces 78. The faces 78 wedge the conductors apart and into tight, frictional contact with the chamber side wall portions. In the preferred embodiment the faces 78 engage the conductors where each is jacketed by an insulator. The insulators are compressed slightly against the chamber wall. When force exerted on the cable 24 or the housing 30 tends to pull the housing from the cable, the wedging engagement between the member 76 and the conductors resists housing separation without applying force to the signal producing assembly.

The latching mechanism comprises latching elements formed by faces 80, 82, located respectively on the positioner member 76 and the housing 30, confronting each other when the member 76 wedges the conductors into place to prevent withdrawal of the member 76 from the housing. In the illustrated embodiment the member 76 carries a keeper face 80 at the wide end of each wedging face 78. Each keeper face 80 intersects its associated wedging face 78 at an acute angle with the face 80 extending from the wedging face end to the member 76.

The latching faces 82 are formed on the base wall portion 50. A positioner member receiving slot 84 extends through the base wall portion 50 from the open chamber end toward the rib 70. The slot 84 extends longitudinally relative to the housing 30 along the base wall portion mid-line. The longitudinally extending slot sides 86 diverge from each other proceeding away from the chamber 32 at an included angle which is larger than the included angle of the wedging faces 78. The latching faces 82 extend along the edges of the slot 84 in the chamber.

The positioner member 76 is inserted into the chamber by forcing the wedging faces 78 through the slot 84 with the wedging faces 78 passing between the slot sides 86. The housing wall portions defining the slot sides 86 and the associated latching faces 82 resiliently deflect away from each other as the wedging faces pass between them. When the wedging faces have passed by, the slot sides spring back to their initial positions so that the latching faces 82 confront the keeper faces 80. The positioner member end can not be withdrawn from the chamber.

In the preferred and illustrated embodiment the positioner member 76 is attached to the temperature sensing assembly 22 before the positioner is inserted in the housing 30 so that the temperature sensing assembly 22 is a one-piece unit. The illustrated positioner member is elongated and has a square or rectangular cross sectional shape. The width of the member 76, except for the wedging faces 78, is less than the width of the slot 84. The member 76 fits easily between the slot sides except when the slot sides are engaged by the wedging faces 78. The member 76 is connected to the housing at the closed end of the slot 84 by a thin flexible hinge strap 88. The member 76, housing 30 and the strap 88 are molded as a single continuous unit. The strap 88 flexes as the positioner end is aligned with and manually pushed through the slot 84 to its latched-in-place location.

The body 74 engulfs, or encapsulates, the signal producing assembly 34 in the chamber 32 to aid in fixing the assembly in place as well as to provide a conductive heat transfer path between the film wall section 40 and the thermistor. The material forming the body 74 is preferably a plastic or epoxy inserted into the chamber 32 in a liquid state before the positioner 76 is latched in place. In order to best assure the absence of air bubbles or other discontinuities in the body 74 the material is flowed into the chamber via a suitable cannula. When the chamber 32 is appropriately filled, the positioner 76 is latched in place and the body 74 is cured. In the preferred embodiment of the invention a potting material known as Conap DPEN 8536 is used to form the body 74.

Figure 6:
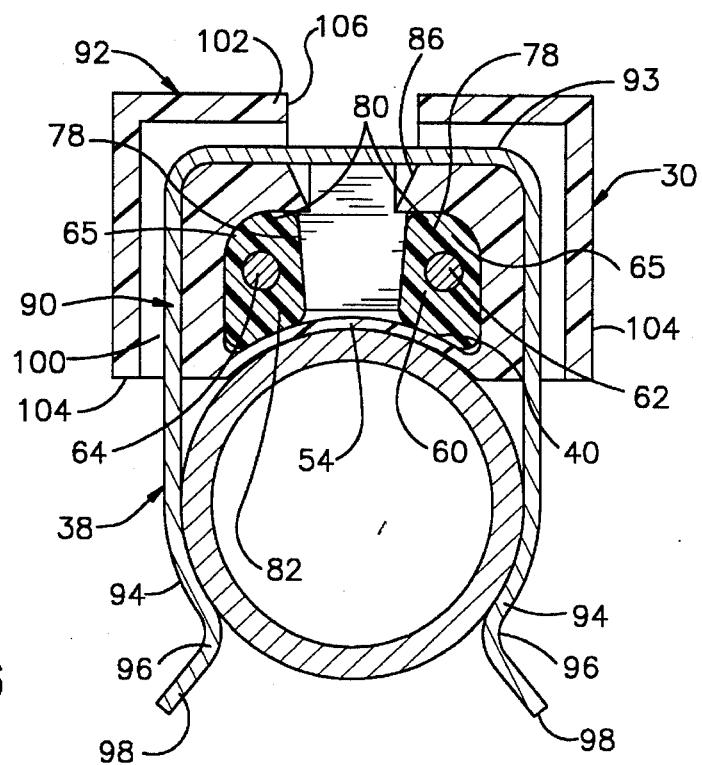
FIG. 6 is a cross sectional view (similar to FIG. 5) of the sensing assembly of FIG. 2 mounted on a flow tube with parts illustrated in alternate positions.

As is best seen in FIG. 6, the positioner member 76 extends to a location immediately adjacent the wall section 40 when latched in place. The wedging faces 78 engage and deform the insulation around the conductors 62, 64 so that the end of the chamber 32 remote from the wall 44 is essentially closed. This prevents loss of liquified potting material from the chamber before the body 74 is cured. Squeezing and deforming the insulating material 65 as described also assures that the conductors are gripped extremely tightly.

The mounting structure 38 retains the temperature sensing assembly 22 in place while forming a highly conductive heat flow path between the heat exchanger and the housing 30. The structure 38 comprises a resilient retainer member 90 secured to the housing 30 and to the flow tube 18, and an insulating jacket 92 for blocking heat transfer between the retainer member and ambient atmospheric air. The retainer member material is a copper (e.g. Copper C17200, ¼ HT), or copper alloy, spring metal having a high thermal conductivity so that heat from both the ambient air and the housing 30 flows through it to the flow tube 18 when the heat pump is operating to heat the building.

The retainer member 90 has a central body portion 93 attached to the heat insulating wall section 42 and projecting gripping fingers 94 resiliently engaging the flow tube 18. The body portion 93 tightly engages and conforms to the exterior of the heat insulating wall section 42. Thus the body portion 93 and the wall section exterior are in contact over a relatively large, heat conductive surface area. The large area conductive interface between the retainer member 90 and the wall section 42 assures maximal heat flow between them. The wall section temperature tends always to approximate the flow tube temperature because of the heat sink-like character of the retainer member.

The fingers 94 project from the housing 30 to the flow tube 18 and define arcuate sections 96 contiguous with outwardly extending tab-like ends 98. The ends 98 guide the fingers onto the flow tube when the assembly 22 is initially mounted and facilitate spreading the fingers during assembly removal. The resilitent arcuate sections 96 confront and closely conform to the flow tube periphery. This maximizes heat flow between the retainer member and the flow tube and minimizes chances for frost or ice buildups between them. The arcuate sections 96 additionally resiliently urge the flow tube into snug contact with the film wall 40.

The insulating jacket 92 minimizes convective heat transfer between the ambient atmospheric air being blown across the heat exchanger 11 and the retainer member 90 and housing section 42. In the preferred and illustrated embodiment the housing 30 is placketed to provide a retainer member receiving channel 100 between the wall section 42 and the surrounding jacket 92. The preferred jacket 92 is molded continuously with the housing 30 and projects from the end wall 44 parallel to the wall section 42. The jacket 92 is relatively thin walled and defines a base wall portion 102 and depending side wall portions 104 projecting from the portion 102 towards the flow tube 18.

The base wall portion 102 is bifurcated to provide a positioner member accommodating slot 106. The positioner member 76 moves through the slot 106 as it is being latched into position while fabricating the assembly 22. The slot 106 is relatively narrow and oriented so that only relatively weak eddy currents of ambient air, if any at all may be established in the channel 100. These currents are insufficient to produce any significant convective heat transfer with the retainer member parts in the channel so the channel is, for all intents and purposes, a "dead" air space.

The side wall portions 104 extend parallel to the retainer member fingers 94 and terminate adjacent the arcuate finger sections 96. The side wall portions 104 shield the retainer member fingers in the channel 100 from the ambient air. Thus the side wall portions 104 block convective heat transfer between the ambient air and the retainer fingers remote from the flow tube 18. The retainer member fingers adjacent the flow tube are subject to convective heat transfer from ambient air blown across the heat exchanger. The retainer member conductivity is so great and the heat transfer coupling between the fingers 94 and the flow tube 18 is so efficient that the ambient air condition has minimal impact on the temperature of the housing 30.

While a preferred embodiment of the invention has been illustrated and described in detail, the present invention is not to be considered limited to the precise construction disclosed. Various adaptations, modifications and uses of the invention may occur to those skilled in the art to which the invention relates. For example, a temperature sensor embodying the invention may be employed in an environment other than a heat exchanger in a refrigeration system. The intention is to cover hereby all such adaptations, modifications and uses which fall within the spirit or scope of the appended claims.

We claim:

1. A temperature sensing assembly for determining the temperature of a member in an ambient fluent medium comprising:

a. a tubular housing formed from a material having high resistivity to thermal conduction comprising a thermally conductive wall section formed by a thin film of said material and a relatively thick, heat insulating wall section, said wall sections defining at least part of a chamber extending in the housing from an opening, said housing mounted on said member with said thermally conductive wall section engaging and in heat transfer relationship therewith;

b. a thermally responsive signal producing assembly comprising an electric signal producing element disposed in said chamber in heat transfer relationship with said thermally conductive wall section, said signal producing element producing signals having values dependant on the temperature thereof, and first and second conductors extending into said chamber for completing an electric circuit through the element;

c. anchoring structure for fixing the signal producing assembly in place in the housing; and, d. heat transfer structure in heat transfer relationship between said heat insulating wall section of the housing and the member, said heat transfer structure tending to maintain the member and heat insulating wall section temperatures the same.

2. The assembly claimed in claim 1 wherein said housing further comprises an insulating jacket surrounding said heat transfer structure.

3. The assembly claimed in claim 2 wherein said heat transfer structure comprises a heat conductive spring member in intimate heat transfer contact with said heat insulating wall section, said insulating jacket being spaced from said spring member.

4. A temperature sensing assembly for determining the temperature of a member in an ambient fluent medium comprising:

a. a housing comprising a thin heat transmitting wall section engaged with said member and a relatively thick, heat insulating structural support wall section;

b. a thermally responsive signal producing assembly comprising an electric signal producing element disposed in heat transfer relationship with said heat transmitting wall section, said signal element producing signals whose values depend on the temperature of said signal element, and first and second conductors for completing an electric circuit through the element;

c. anchoring structure for fixing the signal producing assembly in place with respect to said housing, said anchoring structure comprising a positioner member having an operative position for engaging and positioning the signal producing assembly with said signal producing element in heat exchange relationship with said heat transmitting wall section; and, d. heat transfer structure in heat transfer relationship between said heat insulating wall section of the housing and said member, said heat transfer structure tending to maintain the member and heat insulating wall section temperatures the same.

5. The temperature sensing assembly claimed in claim 4 wherein said housing is formed from a single continuous molded plastic body in which said signal producing assembly is disposed.

6. The temperature sensing assembly claimed in claim 5 wherein said plastic body defines a chamber in which said signal producing assembly is disposed and said anchoring structure further comprises a heat conductive body in said chamber and encapsulating said assembly.

* * * * *